United States Patent
Kumar

(10) Patent No.: US 11,611,719 B2
(45) Date of Patent: Mar. 21, 2023

(54) MANAGEMENT OF VIDEO PLAYBACK SPEED BASED ON OBJECTS OF INTEREST IN THE VIDEO DATA

(71) Applicant: DRAGONFRUIT AI, INC, Menlo Park, CA (US)

(72) Inventor: Amit Kumar, Menlo Park, CA (US)

(73) Assignee: DRAGONFRUIT AI, INC., Menlo Park, CA (US)

( * ) Notice: Subject to any disclaimer, the term of this patent is extended or adjusted under 35 U.S.C. 154(b) by 0 days.

(21) Appl. No.: 17/112,108

(22) Filed: Dec. 4, 2020

(65) Prior Publication Data

US 2022/0182577 A1  Jun. 9, 2022

(51) Int. Cl.
| | | |
|---|---|---|
| *H04N 7/20* | (2006.01) | |
| *H04N 7/01* | (2006.01) | |
| *G06T 7/20* | (2017.01) | |
| *G06K 9/62* | (2022.01) | |
| *G11B 27/031* | (2006.01) | |
| *H04N 5/232* | (2006.01) | |
| *H04N 7/18* | (2006.01) | |
| *G11B 27/00* | (2006.01) | |
| *H04N 5/91* | (2006.01) | |
| *G06V 20/40* | (2022.01) | |
| *G06V 40/10* | (2022.01) | |

(52) U.S. Cl.
CPC .......... *H04N 7/013* (2013.01); *G06K 9/6253* (2013.01); *G06T 7/20* (2013.01); *G06V 20/46* (2022.01); *G06V 40/10* (2022.01); *G11B 27/005* (2013.01); *G11B 27/031* (2013.01); *H04N 5/23229* (2013.01); *H04N 5/91* (2013.01); *H04N 7/183* (2013.01); *G06T 2207/10016* (2013.01); *G06T 2207/30242* (2013.01); *G06V 2201/08* (2022.01)

(58) Field of Classification Search
None
See application file for complete search history.

(56) References Cited

U.S. PATENT DOCUMENTS

| | | | | |
|---|---|---|---|---|
| 2007/0201817 | A1* | 8/2007 | Peker | G06F 16/739 386/343 |
| 2010/0322594 | A1* | 12/2010 | Cheng | H04N 5/783 386/343 |
| 2016/0171669 | A1* | 6/2016 | Abdollahian | G06T 5/005 382/254 |
| 2020/0098147 | A1* | 3/2020 | Ha | H04N 5/232 |

* cited by examiner

*Primary Examiner* — Eileen M Adams

(57) ABSTRACT

Systems, methods, and software described herein manage the playback speed of video data based on processing objects in the video data. In one example, a video processing service obtains video data from a video source and identifies objects of interest in the video data. The video processing service further determines complexity in frames of the video data related to the objects of interest and updates playback speeds for segments of the video data based on the complexity of the frames.

14 Claims, 6 Drawing Sheets

MANAGEMENT OF VIDEO PLAYBACK SPEED BASED ON OBJECTS OF INTEREST IN THE VIDEO DATA

BACKGROUND

Video data can be generated in a variety of different formats to support various different applications. These different formats may include different resolutions, different frame rates, different color gradients, or some other different formatting. As the video data is generated, the data may be imported to a computing device or devices to support editing, surveillance, or other operations in association with the video data. For example, video data may be used by an organization to provide surveillance on one or more properties.

However, as video data is increased for an operation, difficulties can arise in identifying objects of interest in the video data and effectively presenting the video data to a user. In particular, in processing the video data, a user may select objects of interest, the video processing system may identify the objects in the video data and may provide the video data with the objects of interest to the user. However, based on the number of objects and the length of the video data, a user may have difficulty in processing or understanding the information in the video data.

OVERVIEW

Provided herein are systems, methods, and software to manage video playback speed based on objects of interest in video data. In one example, a video processing system obtains video data from a video source and identifies objects of interest in the video data. The video processing system further determines complexity ratings in frames of the video data for the objects of interest and updates playback speeds of the video data based on the complexity ratings, wherein different segments of the video data are allocated a different playback speed.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The various examples disclosed herein provide for managing video playback speeds based on complexity associated with segments of the video data. In computing environments, a video processing service may be used to obtain video data, process the video data to find relevant objects in the video data, and present the processed video to a user of the video processing service. Here, in addition to identifying objects of interest in the video data, the video processing service may modify and change the playback speed associated with different segments of the video data to promote understanding of the video data.

In one implementation, the video processing service may obtain or receive video data from a video source and identify objects of interest in the video data. The video data may be obtained from a camera or a video storage device, which can include solid state or mechanical storage. The objects of interest may be manually selected in the video data by a user or may be identified using attributes, such as color, shape, object type, or some other attribute provided by a user. Once the objects are identified, the video processing service may determine a complexity in frames of the video data related to the objects of interest. The complexity may comprise a value that is based on the number of objects of interest in the frame, the movement of the objects of interest in the frame, the proximity of the objects of interest in the frame, or some other factor. Once determined, the complexity for the frames may be used to determine a playback speed for different segments in the video data. For example, a first segment with frames that are more complex may be assigned a playback speed of a first rate, while a second segment with frames that are less complex may be assigned a playback speed of a second rate. Advantageously, segments that are less complex or can be quickly processed by a user may be provided at an increased speed, while segments that are more complex can be provided at a decreased speed to permit further processing by the viewing user.

In some implementations, the video processing service may permit the user to provide feedback to video data. In particular, a first version of the video data may be provided to the user with one or more playback speeds. Once provided, the user may indicate objects of interest, objects to be removed, or some other information in association with the objects or the video data and the video processing service may update the video data based on the feedback. The update may be used to remove objects of interest, playback speeds, or some other information related to the display of the video data to the user. The feedback operation may be repeated as the user may select and deselect operations of interest, while the video processing service updates the playback speeds and objects viewable in the video data.

Figure 1:
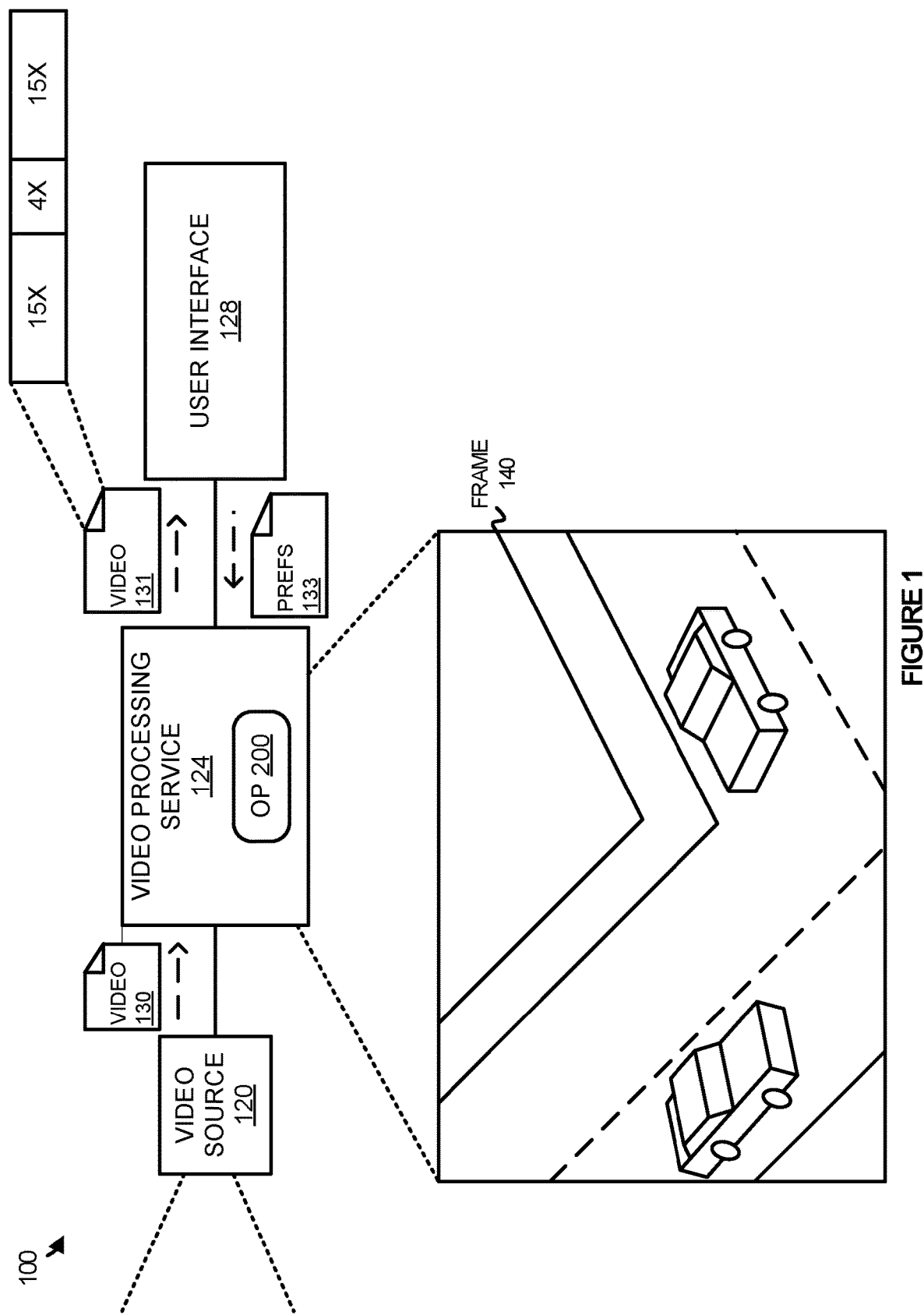
FIG. 1 illustrates a computing environment to manage video playback speed according to an implementation.

FIG. 1 illustrates a computing environment 100 to manage video playback speed according to an implementation. Computing environment 100 includes video source 120, video data (video) 130-131, video processing service 124, user interface 128, and frame 140. Video processing service 124 provides operation 200 that is described further in FIG. 2. Video processing service 124 may execute on one or more desktop computers, server computers, or some other computing element or elements.

In operation, video processing service 124 obtains video data 130 from video source 120. Video source 120 may comprise a video camera or a video storage system that stores video data on solid state storage, disk drives, or some other storage device. When the video data is received, video processing service 124 may process the video data to identify objects of interest. In some implementations, a user at user interface 128 may provide preferences for the video data indicating preferences 133 or attributes for identifying objects of interest in the video data. The attributes may include one or more object types, object colors, object shapes, or some other attributes. For example, using frame 140, the user may identify car objects that are white. Once selected, video processing service 124 may perform image processing on the frames to identify relevant objects in the frames with the requested attributes.

In the present implementation, as the objects are identified in the frames of the video data, video processing service 124 may further determine or monitor the complexity associated with different portions of the video data. The complexity determination may be based on the number of objects of interest in the frame or frames, may be based on the speed of the one or more objects in the frame, may be based on the proximity of one or more objects in the frame, or may be based on some other factor. For example, traffic monitoring video data may identify all cars that are white. When more white cars are in a segment of the video data, video processing service 124 may identify the segment as more complex than a second segment of the video data with less white cars. Based on the complexity in the various segments of the video data, video processing service 124 may update or modify the playback speed associated with the various segments of the video data. For example, a more complex portion may be designated a playback speed of 2X, while a less complex portion may be designated a playback speed of 10X. Once the playback speed is updated for the video data, the video data may be provided to user interface 128 for display to a user. In some examples, when objects of interest are identified, video processing service 124 may further highlight using a box, a pointer, a brighter contrast, or some other highlighting mechanism the objects of interest.

In some implementations, video processing service 124 may provide additional processes with respect to the video data. The additional processes may include removing objects that are not of interest to the end user, wherein video processing service 124 may search the video for other types of objects, such as cars that are not the requested color, and remove the objects by replacing them with an expected background from another captured frame. In another implementation, user interface 128 may permit the user to view the video data using the playback rates and select one or more objects in the video data that are not relevant to the user. These selected objects may include objects that are not identified as relevant objects of interest to the user. Once selected, video processing service 124 may update the video data to remove the selected objects from the video data and update the playback speed to reflect the removal of the object. Similarly, the user may manually select objects of interest in the video data and video processing service 124 may update the playback speed to reflect the manually selected objects.

Figure 2:
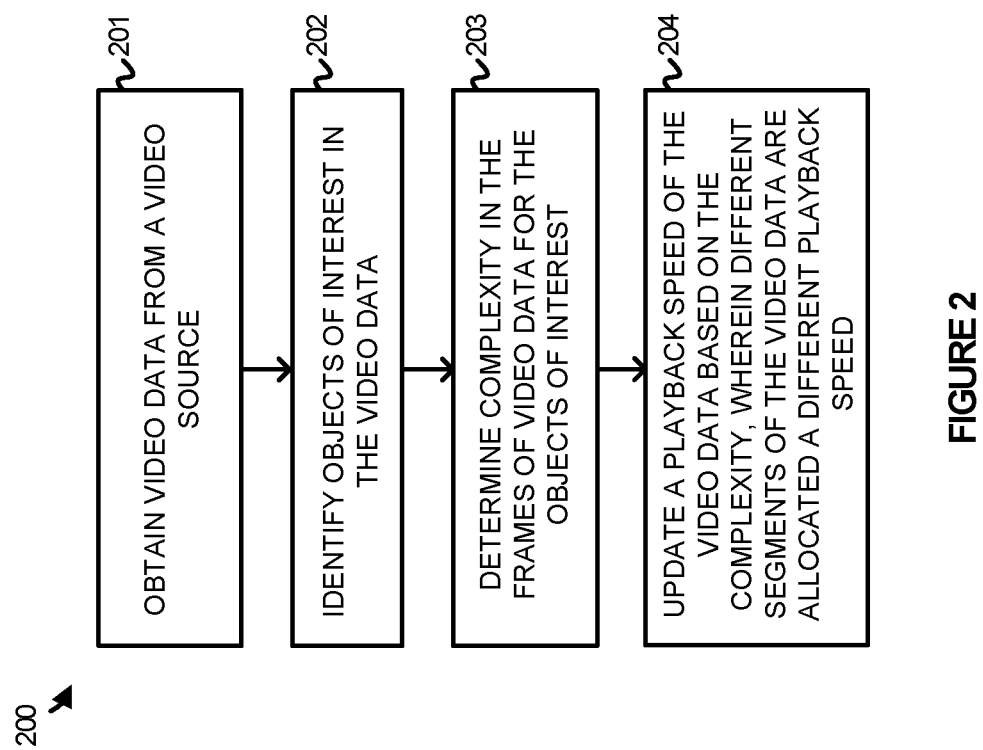
FIG. 2 illustrates an operation of a video processing service to manage video playback speed according to an implementation.

FIG. 2 illustrates an operation 200 of a video processing service to manage video playback speed according to an implementation. The steps of operation 200 are referenced parenthetically in the paragraphs that follow with reference to systems and elements of computing environment 100 of FIG. 1.

As depicted, operation 200 includes obtaining (201) video data from a video source, wherein the video source may comprise a video camera or a video storage device. The video storage device may comprise one or more solid state storage devices, storage disks, or some other storage device. As the video data is obtained, operation 200 further identifies (201) objects of interest in the video data. In some implementations, a user may select attributes for the objects of interest, wherein the attributes may include one or more object types, one or more object colors, or one or more object shapes. For example, a user may select to monitor all persons in the video data with a green shirt. Once the attributes are selected by the user, video processing service 124 may process the video data to identify objects of interest in the frames that match the requested attributes.

Once the objects of interest are identified in the video data, operation 200 further determines (203) complexity in frames of the video data related to the objects of interest. The complexity may be determined based on the quantity of objects of interest in the frames, the speed or amount of movement by the objects in the frames, or some other complexity factor that could influence a viewer's understanding of the objects in the frame. As an example, video processing service 124 may process video data 130 from video source 120 to identify vehicles in the frames, such as frame 140. As the number of vehicles increase in a frame, the frame may be labeled as more complex than frames with a lesser number of vehicles. In addition to or in place of the number of objects in the frame, video processing service 124 may monitor the speed of the objects of interest in the frame or the proximity of the objects to each other in the frame to determine the complexity for the user in understanding what is happening in the video data. The more objects, movement, or proximity of the objects, the more complex the video data may be to understand.

After determining the complexity associated with the frames in the video data, operation 200 further updates or modifies (204) the playback speed of the video data based on the complexity, wherein different segments of the video data are allocated a different playback speed. Once updated, the video data may be displayed at user interface 128 using the updated playback speed. For example, video processing service 124 may identify that the first five minutes of a ten minute video are less complex than the last ten minutes of the video. As a result, video processing service 124 may allocate a first playback speed to the first five minutes and a second playback speed to the second five minutes. In some implementations, the first playback speed may be faster than the second playback speed, permitting the user at user interface 128 to more closely analyze the more complex portions of the video. In some examples, the objects of interest may be highlighted in the video data, such that the user can identify the objects. The objects may be highlighted using an outline, arrows, a different contrast, or some other highlighting mechanism to identify the objects of interest in the video data.

In some examples, user interface 128 may permit the user to make modifications to the video data once it is provided to the user. These modifications may include selecting objects of interest identified in a first version of the video data to indicate that they are not of interest to the user. In response to the selection, video processing service 124 may reprocess the video data to update the playback speed based on the removed one or more objects of interest. Similarly, the user may manually select one or more objects in a first version of the video data to be added to the objects of interest. In response to the selection, video processing service 124 may reprocess the video data to update the playback speed of the video data to reflect the selections. Video processing service 124 may also perform machine learning, wherein objects that are manually selected as objects of interest or removed from the identified objects of interest may be identified in future video data as relevant or irrelevant to the user.

In some implementations, video processing service 124 may be used to remove objects in the video data that are not identified as objects of interest. For example, a user may indicate that objects of interest are all white vehicles. From the user preferences, video processing service 124 may identify any vehicle in the video data that is not white and remove the vehicles from the video data by using an estimated background or inserting one or more pixels from a previous frame that did not include the vehicle. Using frame 140, if one of the vehicles was not relevant to preferences 133, video processing service 124 may identify the pixels occupied by the vehicle and replace at least a portion of the pixels with a previous or succeeding frame (assuming the camera is stationary).

Figure 3:
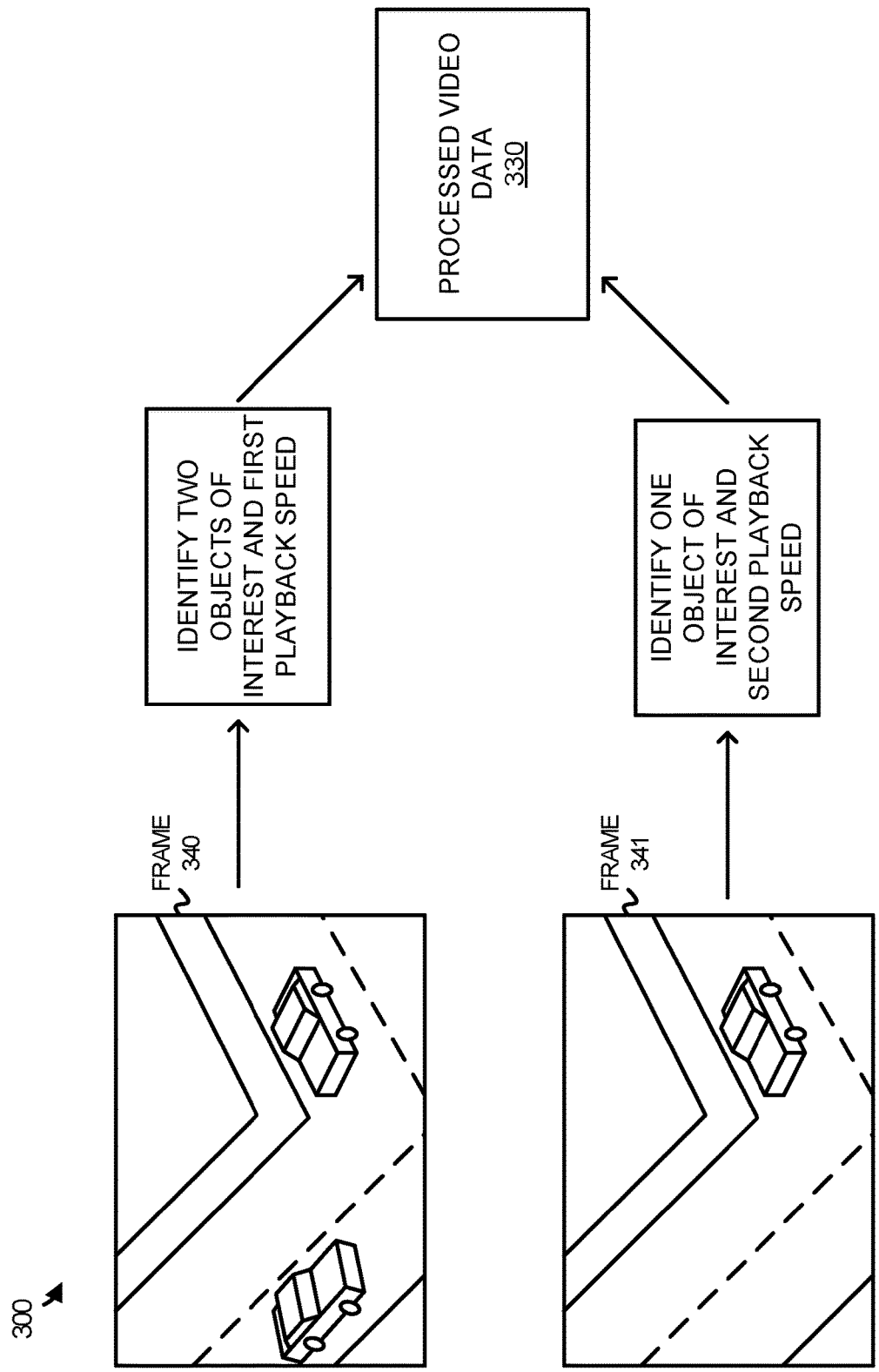
FIG. 3 illustrates an operational scenario of modifying video playback speed according to an implementation.

FIG. 3 illustrates an operational scenario 300 of modifying video playback speed according to an implementation. Operational scenario 300 includes frames 340-341 and processed video data 330.

In operation, video data is obtained by a video processing service to determine playback rates associated with different portions of the video. When the video data is obtained, the video processing system may identify objects of interest in the video data, wherein the objects of interest may be identified using attributes in some examples. These attributes may be defined by a user of the video processing service, wherein the user may define shapes, colors, object types, or other information associated with the objects of interest. Once the attributes are received, the video processing service may process the video data to identify objects of interest that match the attributes. The user may also manually select the objects of interest in one or more frames of the video in some examples.

After the objects of interest are identified, the video processing service may determine how complex the objects of interest are in the frames. The complexity of the frames may be determined based on the quantity of objects, the movement of the objects, the proximity of the objects, or some other factor. Here, the video processing service determines in frame 340 that two objects of interest are in the frame and that frame should be played at a first playback speed. In contrast, when the video processing service processes frame 341, the video processing service identifies one object of interest and a second playback speed for the frame. Once the frames are processed, processed video data 330 is generated for display, wherein different segments of processed video data 330 are allocated a different playback speed. Advantageously, when played for a user, processed video data 330 may provide a slower playback speed for portions of the video data with more complexity, while a faster playback speed may be provided for portions of the video data with less complexity. In some examples, the complexity may be measured as a score based on one or more of the aforementioned factors, wherein the score may correspond to a playback speed for the video data.

In some examples, the user interface for the video data, which may be located on the same device or devices as the video processing service or a client device, may permit the user to provide feedback regarding a provided video. In particular, the user may manually select or deselect objects of interest, provide a preference to remove or not make visible one or more objects in the video data, change the attributes associated with the objects of interest, manually change the playback speed associated with one or more segments of the video data, or provide some other feedback regarding the video. In response to the selections, the video processing service may update the video data to support the request. In some implementations, the update may include updating the playback speeds associated with one or more segments of the video data, removing the requested objects from the video data, or providing some other operation with respect to the video data. In some examples, the video processing service may perform machine learning, wherein the selections from first video data may be used in processing future video data. For example, if a user indicates that segments with three objects of interest should be set to a playback speed of 4× instead of 8×, the video processing service may store these preferences and enforce the preferences on the next processing of video data.

Although demonstrated as identifying two different playback speeds for the video data, it should be understood that any number of playback speeds may be identified for a video. Additionally, while being demonstrated as using the number of objects to determine complexity and the corresponding playback speed, the video processing service may use any number of factors in determining the complexity associated with the frames, including the movement of the objects in the frame, the proximity of the objects in the frame, or some other factor.

Figure 4:
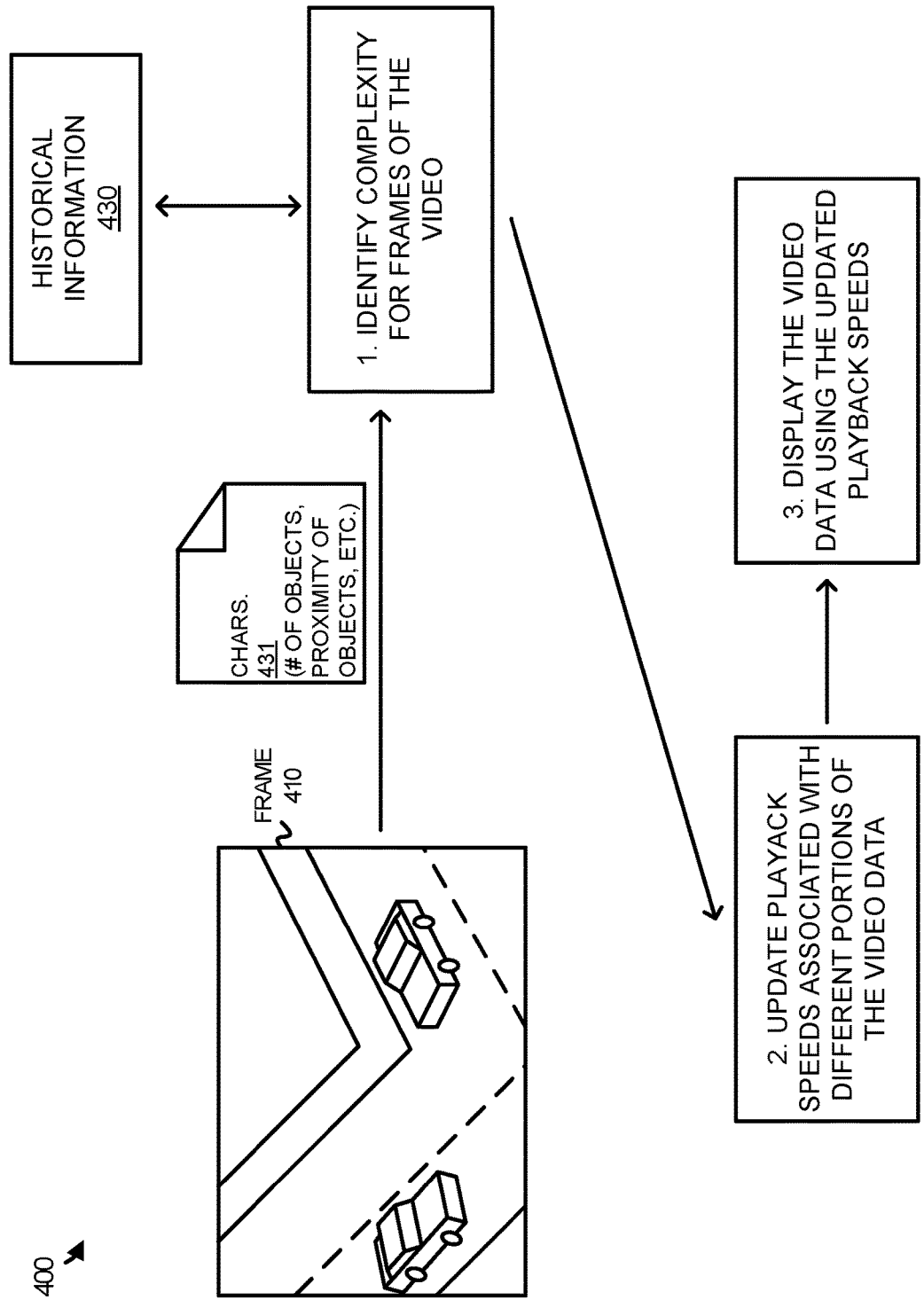
FIG. 4 illustrates an operational scenario of using historical information and complexity to manage video playback speed according to an implementation.

FIG. 4 illustrates an operational scenario 400 of using historical information and complexity to manage video playback speed according to an implementation. Operational scenario 400 includes frame 410, characteristics 431, and historical information 430.

In operation, video data is received by a video processing system and processed to determine playback speeds associated with different segments in the video data. Here, frames of video data, such as frame 410, are processed to identify complexity characteristics 431 in the frame. The complexity characteristics may include the number of objects of interest in the frame, the proximity of the objects of interest to other objects, the movement of the objects in the frame, or some other characteristic. As the characteristics are identified, the video processing service identifies, at step 1, complexity for the frames and segments of video based on the characteristics and historical information 430. Historical information 430 may include previous indications of complexity from a user (e.g., complexity preferences) where a user may indicate that a set of characteristics is more complex than other characteristics. For example, a user may slow the playback speed for video from 8× to 4× and historical information 430 may cache information about the segment indicating the types of characteristics that can make a segment more complex.

Once the complexity is determined for the frames, the video processing service may update, at step 2, playback speeds associated with different portions of the video data. In at least one implementation, the video processing service may allocate a complexity score or value to the different frames in the video data or set of frames in the video data. The complexity value may then be associated with a playback speed for that segment. For example, a first set of frames representing a first segment may be allocated a first complexity value, while a second set of frames representing a second segment may be allocated a second complexity value. The different complexity values may each be associated with a different playback speed, resulting in one segment of the video data being displayed at a first speed, while a second segment of video data is displayed at a second speed.

Once the playback speeds are determined for the various portions of the video data, the video processing service may further display, at step 3, the video data using the updated playback speeds. In some implementations, the display may occur on the same device that processed the video data. In other implementations, the video data may be displayed as part of a browser or dedicated application on a user device, such as a smartphone, laptop computer, desktop computer, tablet or some other device. In some implementations, the display may permit the user to provide attributes associated with the object of interest, manually select or deselect objects as objects of interest, manually change the playback speed of one or more of the segments, or may provide some other feedback. In response to the feedback, the video processing service may process the video data in accordance with the request.

In some implementations, a user may select an object of interest, such as a person, and the video processing service may monitor the movement of the object. In monitoring the movement of the object, the video processing service may determine when the object of interest is in proximity to other objects and tag the segments as more complex. In the example of a person as the object of interest, the video processing service may monitor the person and determine when the person is in close proximity with other objects, such as persons, landmarks, or other objects in the frame. When in close proximity the segment of the video data may be flagged as complex and the playback speed may be updated to reflect the complexity of the segment. The update may be used to slow the playback speed when the person is near one or more other objects of interest and speed up the playback speed when the person is not near any of the other objects of interest.

Figure 5:
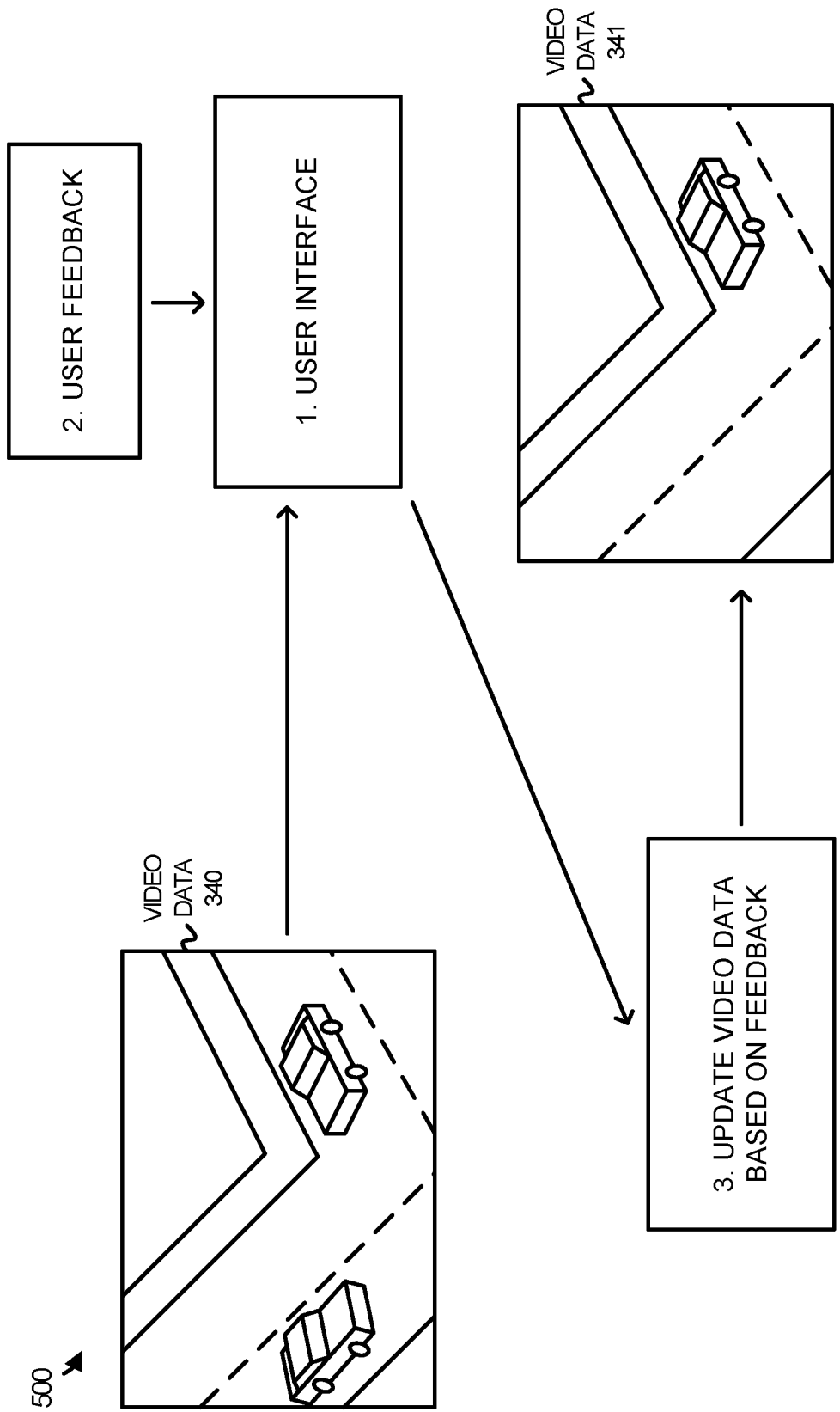
FIG. 5 illustrates an operational scenario of using user input to select objects of interest and preferences according to an implementation.

FIG. 5 illustrates an operational scenario 500 of using user input to select objects of interest and preferences according to an implementation. Operational scenario 500 includes video data 340 and video data 341.

In operation, video data 340 may be provided, at step 1, in a user interface by a video processing service, wherein video data 340 may represent security camera video, surveillance video, or some other video. As the video data is provided, the user may provide preferences or feedback, at step 2, to update the video data in a format desired by the user. The feedback may be provided via dropdown menus, check boxes, or some other feedback mechanism. The feedback mechanisms may be used to provide attributes for the objects of interest, may be used to select relationships or other criteria to determine complexity in the frames, may be used to adjust the playback speed for one or more segments, or may be used to provide some other feedback. In some implementations, the user may manually select objects in the video data, such that the objects can be removed or identified as an object of interest to the user.

Once the user feedback is received, the video processing service updates, at step 3, the video data based on the feedback. The update may be used to manually select or deselect objects in the video data as objects of interest, manually change the playback speed associated with one or more portions of the video data, implement preferences for determining complexities in the frames, or implement some other update to the video data. Here, the user feedback requests the removal of an object from video data 340 to generate video data 341. The object selected for removal may comprise an identified object of interest or may comprise another object in the video data. In removing the object, the video processing service may identify pixels associated with the object in the video data and replace the pixels with pixels from frames that preceded or succeeded the object. Replacing the object with an image of the background determined from other frames of the video data.

Figure 6:
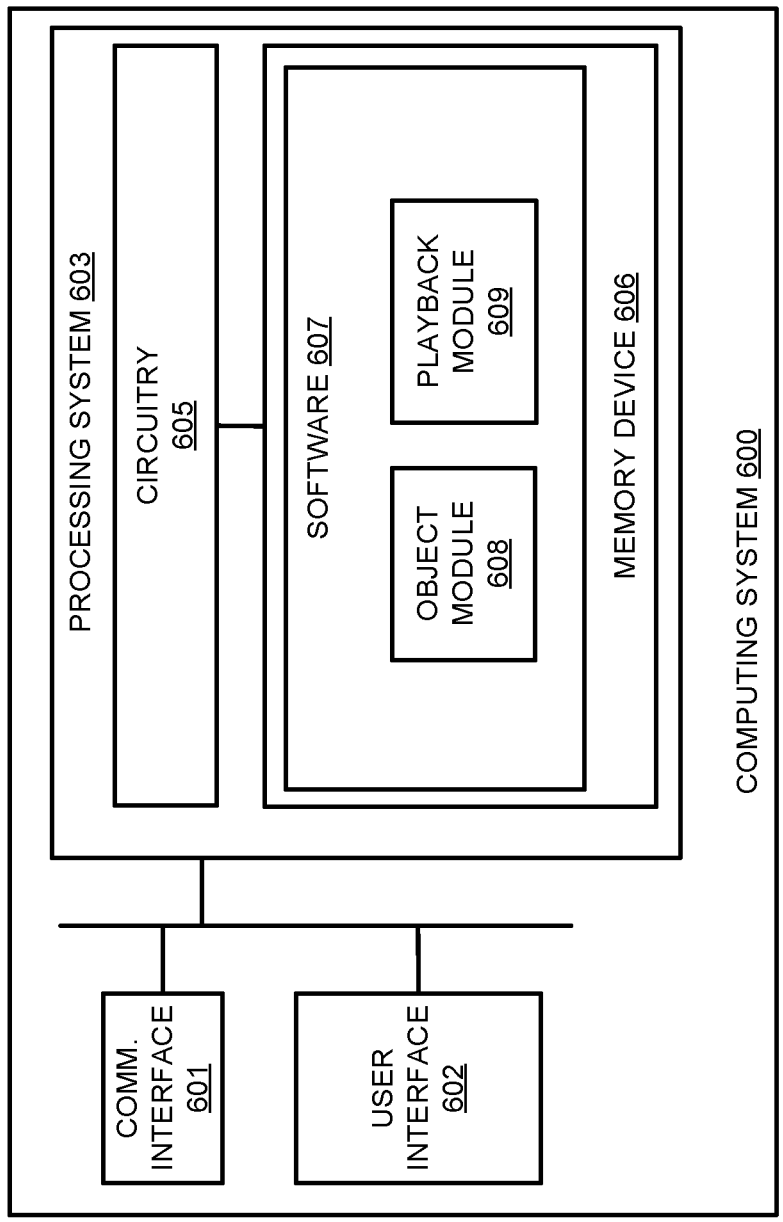
FIG. 6 illustrates a computing system to manage video playback speed according to an implementation.

FIG. 6 illustrates a computing system 600 to manage video playback speed according to an implementation. Computing system 600 is representative of any computing system or systems with which the various operational architectures, processes, scenarios, and sequences disclosed herein for an end computing element, such as computing element 110 of FIG. 1. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 may be configured to communicate with one or more cameras or video data storage systems to obtain video data. Communication interface 601 may further be configured to one or more client computing systems to provide a user interface for the video data and information processed from the video data.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. In some implementations, user interface 602 may include an image capture device to capture video data. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes object module 608 and playback module 609, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein. In at least one implementation, operating software 607 directs processing system 603 to provide at least operation 200 of FIG. 2.

In one example, object module 608 directs processing system 603 to obtain video data from a video source and identify objects of interest in the video data. The video source may comprise a camera or may comprise a video storage device, which may include one or more storage disks, solid state disks, or some other storage device or devices. The objects of interest may be identified by manual selection by a user or may be identified using attributes associated with the objects of interest. The selection may be made locally using user interface 602 or may be made using a client computing device that communicates with computing system 600 using communication interface 601.

In the example of manual selection, the user may be provided with a first version of the video data with a first playback speed or speeds, and the user may select objects in the video data that are relevant to the user. In the example of using attributes, a user may select attributes using drop down menus, check boxes, or some other selection mechanism. The attributes may include an object type, color, shape, or some other attribute associated with the objects of interest. Once the attributes are defined for the objects of interest, object module 608 may direct processing system 603 to identify objects in the video data that include the relevant attributes. In some implementations, the user may select a first object of interest and object module 608 may determine one or more other objects of interest based on processing the video data. For example, a user may select a person of interest in video data and object module 608 may process the video data to determine one or more other persons of interest based on the proximity of the other persons to the original person of interest.

As the objects of interest are identified, playback module 609 directs processing system to determine complexity in frames of the video data for the objects. The complexity may be determined based on the number of objects of interest in the frames, the movement associated with the objects of interest (e.g., proximity of the objects of interest to other objects), or some other factor. In some implementations, playback module 609 may allocate scores to individual frames or sequences of frames, wherein the scores may be based on any of the aforementioned factors. In some examples, playback module 609 may process all of the frames, however, it should be understood that the complexity may be calculated for a subset of the frames in the video data to preserve resources associated with processing every frame.

Once the complexity is determined, playback module 609 directs processing system 603 to update playback speeds of the video data based on the complexity, wherein different segments of the video data are allocated a different playback speed. In some implementations, segments of the video data that are identified to be more complex may be allocated a slower playback speed in relation to segments of the video data that are identified to be less complex. For example, a segment that includes five objects of interest may be allocated a playback speed that is slower than another segment that includes a single object of interest. Advantageously, by slowing the playback speed associated with segments that are more complex a user may have more time to interpret the information in the segment. Once the playback speeds are determined, the video data may be display for the user as part of a user interface. The user interface may further highlight or promote the identified objects of interest in the video data, indicate the playback speed for the different portions of the video data, or provide some other information about the video data to the user.

In some implementations, when the objects of interest are identified in the video data, one or more segments of the video data may not include any objects of interest. As a result, these portions of the video data may be skipped entirely when updating the playback speeds or set to an "infinite" playback speed, such that they are quickly skipped over for the viewing user.

In some implementations, a first version of the video data may be provided to a user and the user may make changes to the first version of the video data using the user interface. These changes may include manually selecting or deselecting objects of interest, removing objects from the video data, manually adjusting the playback speed of the video data, or providing some other feedback. Based on the information from the user, the video data may be reprocessed to create a new version of the video data that reflects the preferences provided by the user. In some examples, the feedback provided by the user may be used on other video data, such as preferences for playback speeds associated with different complexity values, objects identified as objects of interest, or some other preference.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
obtaining video data from a video source;
identifying objects of interest in the video data, wherein the objects of interest comprise vehicles or people;
determining complexity in frames of the video data for the objects of interest, wherein the complexity comprises at least a quantity of the objects of interest in the frames, an amount of movement by the objects of interest in the frames, and a physical proximity between at least two of the objects of interest in the frames; and
updating playback speeds of the video data based on the complexity, wherein different segments of the video data are allocated a different playback speed, and wherein one or more frames of the frames are skipped when no objects of interest are detected in the one or more frames.

2. The method of claim 1, wherein the video source comprises video storage or a video camera.

3. The method of claim 1, wherein updating the playback speeds of the video data based on the complexity comprises updating a first one or more segments with a first complexity with a first playback speed and a second one or more segments with a second complexity.

4. The method of claim 1, wherein identifying the objects of interest in the video data comprises:
receiving a selection of one or more attributes associated with the objects of interest; and
identifying the objects of interest in the video data with the one or more attributes.

5. The method of claim 4, wherein the one or more attributes comprise one or more object types, one or more object colors, or one or more object shapes.

6. The method of claim 1 further comprising:
   identifying one or more objects that are not the objects of interest to be removed from the video data; and
   removing the one or more objects from the video data.

7. A computing apparatus comprising:
   a storage system;
   a processing system operatively coupled to the storage system; and
   program instructions stored on the storage system that, when executed by the processing system, direct the computing apparatus to:
      obtain video data from a video source;
      identify objects of interest in the video data;
      determine complexity in frames of the video data for the objects of interest, wherein the complexity comprises at least a quantity of the objects of interest in the frames and an amount of movement by the objects of interest in the frames, and a physical proximity between at least two of the objects of interest in the frames; and
      update playback speeds of the video data based on the complexity, wherein different segments of the video data are allocated a different playback speed, and wherein one or more frames of the frames are skipped when no objects of interest are detected in the one or more frames.

8. The computing apparatus of claim 7, wherein the video source comprises video storage or a video camera.

9. The computing apparatus of claim 7, wherein the updating playback speeds of the video data based on the complexity comprises updating a first one or more segments with a first complexity with a first playback speed and a second one or more segments with a second complexity.

10. The computing apparatus of claim 7, wherein identifying the objects of interest in the video data comprises:
    receiving a selection of one or more attributes associated with the objects of interest; and
    identifying the objects of interest in the video data with the one or more attributes.

11. The computing apparatus of claim 10, wherein the one or more attributes comprise one or more object types, one or more object colors, or one or more object shapes.

12. The computing apparatus of claim 7, wherein the program instructions further direct the computing apparatus to:
    identify one or more objects that are not the objects of interest to be removed from the video data; and
    remove the one or more objects from the video data.

13. A method comprising:
    obtaining video data from a video storage device;
    receiving a selection of one or more attributes for objects of interest in the video data;
    identifying the objects of interest in the video data;
    determining complexity in frames of the video data for the objects of interest, wherein the complexity is determined at least in part on a quantity of the objects of interest in the frames and an amount of movement of the objects of interest in the frame, and a physical proximity between at least two of the objects of interest in the frames; and
    updating playback speeds of the video data based on the complexity, wherein different segments of the video data are allocated a different playback speed, and wherein one or more frames of the frames are skipped when no objects of interest are detected in the one or more frames.

14. The method of claim 13, wherein the one or more attributes comprise one or more object types, one or more object colors, or one or more object shapes.

* * * * *